United States Patent [19]

Dickinson

[11] Patent Number: 5,021,209
[45] Date of Patent: Jun. 4, 1991

[54] PROCESS FOR FORMING AN EXTRUSION-BLOW MOLDED ULTRATHIN CONTAINER USING A HEAT GENERATING PINCH OFF ARRANGEMENT

[75] Inventor: Albert B. Dickinson, Muscle Shoals, Ala.

[73] Assignee: Edward S. Robbins, III, Florence, Ala.

[21] Appl. No.: 429,779

[22] Filed: Oct. 31, 1989

[51] Int. Cl.⁵ .................... B29C 33/42; B29C 49/04; B29C 49/50
[52] U.S. Cl. .................... 264/540; 264/521; 264/536; 425/526; 425/527
[58] Field of Search ............... 264/523, 520, 521, 536, 264/540; 425/526, 527

[56] References Cited

U.S. PATENT DOCUMENTS 4,105,730  8/1978  Cammarata et al. ............... 264/536

Primary Examiner—Jan H. Silbaugh
Assistant Examiner—Catherine Timm
Attorney, Agent, or Firm—Nixon & Vanderhye

[57] ABSTRACT

Apparatus and a related process for blow molding an ultra thin plastic film bag in which sufficient heat is generated in the process to form an effective heat seal or weld along an edge of the bag. The blow mold halves are provided with laterally aligned, outwardly extending projections intermediate upper and lower edges of vertical parting wall surfaces of the mold halves. The projections and cavities formed above and below the projections are configured so that the temperature of the plastic during blow molding and pinch off above the melting point of the plastic to heat seal an edge of the bag. The invention also provides an ultra thin film plastic bag formed with a heat sealed bottom seam.

7 Claims, 4 Drawing Sheets

PROCESS FOR FORMING AN EXTRUSION-BLOW MOLDED ULTRATHIN CONTAINER USING A HEAT GENERATING PINCH OFF ARRANGEMENT

BACKGROUND AND SUMMARY OF THE INVENTION

This invention relates to blow molded containers and, specifically, to blow molded ultra thin film containers, such as non-self-supporting plastic bags which have a thickness in the range of about 1 to 10 mil. The invention also relates to a method and apparatus for forming such containers.

In the past, it has been the conventional practice to manufacture non-self-supporting thin film bags by a continuous blown film process where an extruded tubular parison is blown radially outwardly to a desired thin wall configuration without the use of molds or dies. The tubular parison is subsequently flattened, or collapsed, and perforations or score lines and heat sealed bottom seams are formed at spaced locations to define individual bags. The continuously formed bags are then rolled up on a take-up roll or drum.

It has also been attempted to blow mold thin film containers. In this process, a parison is blown outwardly into conformance with container-shaping surfaces provided within the interior of a blow mold cavity. However, it has not been possible in the past to form a high quality, effective heat seal on the top, around or across the bottom of the bag in light of the relatively cooled condition of the blow mold halves. In other words, even if the parison remains in a heated condition, contact by the parison with the otherwise relatively cool blow mold halves, draws sufficient heat away from the bottom seam area of the bag to prevent an effective heat seal from being formed.

The present invention provides apparatus and a related process for blow molding an ultra thin plastic film bag wherein the mold apparatus is uniquely configured to generate sufficient heat in the process to form an effective heat seal or weld along the edge of the bag without increasing the wall thickness of the bag in the seam area.

In one preferred embodiment of the invention, the blow mold halves are provided with laterally aligned, outwardly extending projections intermediate upper and lower edges of vertical wall surfaces defining the parting line of the mold halves. These projections serve to pinch off the parison during closure of the mold halves. The projections also form, in conjunction with vertical surfaces of the mold halves, upper and lower cavities above and below the laterally aligned projections. The upper cavity results in a hollow groove being formed along the length of the pinch off projections during blow molding. The lower cavity is no wider than the upper cavity and should have a width less than twice the parison wall thickness so that upon closure of the mold halves, the parison flash material below the pinch off projections is compressed out of the lower cavity. It is this squeezing or compression of material which generates heat sufficient to raise the temperature of the plastic material in the upper cavity above its melting point. As a result, an effective heat seal or weld is formed along the mold parting line, just above the pinch off projections.

It will be understood that the width and depth of the upper cavity and the width of the lower cavity will be determined by the particular plastic material used in the process.

The pinch off projections are identically formed, each having a horizontally projecting surface, and a downwardly and inwardly inclined surface, the intersection of the two forming a pinch off edge. The angle which the inclined surface makes relative to the horizontal surface is also important to the integrity of the heat sealed seam, as will be explained in greater detail further herein.

Thus, in one aspect of the present invention a method of forming an ultra thin film plastic container and heat sealing the seam thereof comprising the steps of:

a) forming a plastic parison of a first predetermined thickness;

b) providing a pair of blow mold halves, each of which is formed with a vertical parting line surface including a pinch-off projection intermediate upper and lower edges of the parting line surface;

c) closing the blow mold halves about the parison;

d) blow molding the parison within a mold cavity formed by the blow mold halves to form an ultra thin film plastic container having a second predetermined thickness less than the first predetermined thickness;

wherein step (b) is carried out by shaping the pinch-off projections and upper and lower portions of the parting line surfaces to generate sufficient heat during steps (c) and (d) to cause the parison to reach a temperature at least equal to a melting point temperature of the plastic to thereby provide an effective heat seal along a seam immediately adjacent the pinch-off projections.

In another aspect, the present invention provides a blow mold construction comprising a pair of mold halves which together form a mold cavity, each of which includes a parting line surface around the mold cavity, the parting line surface at one end of the mold having an upper portion, a lower portion, and an intermediate projecting portion, the pair of mold halves together forming an upper recess in the mold cavity and a lower recess external of the mold cavity, wherein the width of the lower recess is selected so that it is less than two times the wall thickness of a parison to be blow molded within the cavity.

In still another aspect, the present invention provides an ultra thin film plastic container comprising a one piece tubular member having a wall thickness of from about 1 to about 10 mil, and a seam along at least a portion of a bottom edge, said seam located within a hollow groove.

Additional objects and advantages of the present invention will become apparent from the detailed description which follows.

DETAILED DESCRIPTION OF THE DRAWINGS

Figure 1:
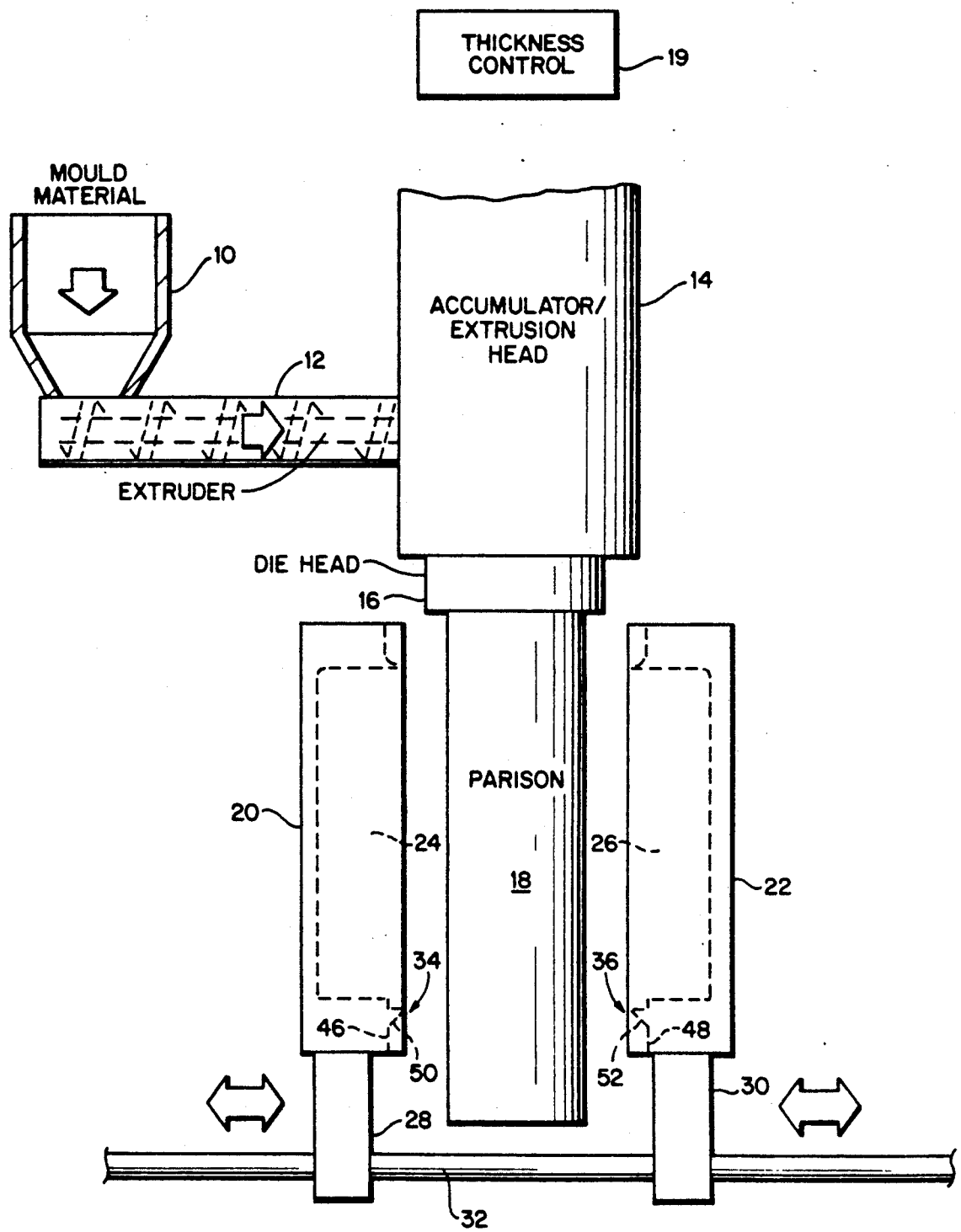
FIG. 1 is a front view, partially in section, showing an extrusion-blow molding apparatus in accordance with the invention.

Referring now to FIG. 1, an extrusion-blow molding apparatus is illustrated wherein plastic material is fed from a hopper 10 to an extrusion barrel 12, which, in turn, supplies the material under pressure to an an extrusion head and/or accumulator 14. The material is then discharged through a die head 16 in the form of an open ended tubular parison 18, the wall thickness of which may be controlled by a conventional die orifice control device shown schematically at 19.

Parison 18 is oriented generally vertically, but not necessarily in alignment with a pair of blow mold halves 20 and 22, having interior container-shaping surfaces which define mold cavity halves 24, 26. It will be appreciated that the mold halves when brought together form a substantially closed molding cavity, and that a blow pin (not shown) may be inserted into the interior of the parison for introducing air under pressure within the parison to blow the latter outwardly into conformance with the shaping surfaces within the mold cavity.

The mold halves 20, 22 are mounted on platens 28, 30 and moved by hydraulic cylinders (not shown) with or without guide tracks 32 for moving the mold halves 20, 22 toward and away from each other, also in a conventional fashion.

The lower wall surfaces 34, 36 of the mold halves 20, 22, respectively, serve to pinch-off the bottom of the parison, providing plastic material below the mold halves.

To this point, the description has been directed merely to what is already known and conventional in the blow molding field.

This invention relates to a unique manner in which an effective heat seal can be obtained along the mold parting line during the formation of ultra thin film plastic containers, preferably bags, i.e., those having a wall thickness of from about 1 to about 10 mil.

Preferably, the containers produced in accordance with this invention are formed of suitable thermoplastic materials such as high density polyethylene, low density polyethylene, polypropylene or other plastic olefins.

Figure 2:
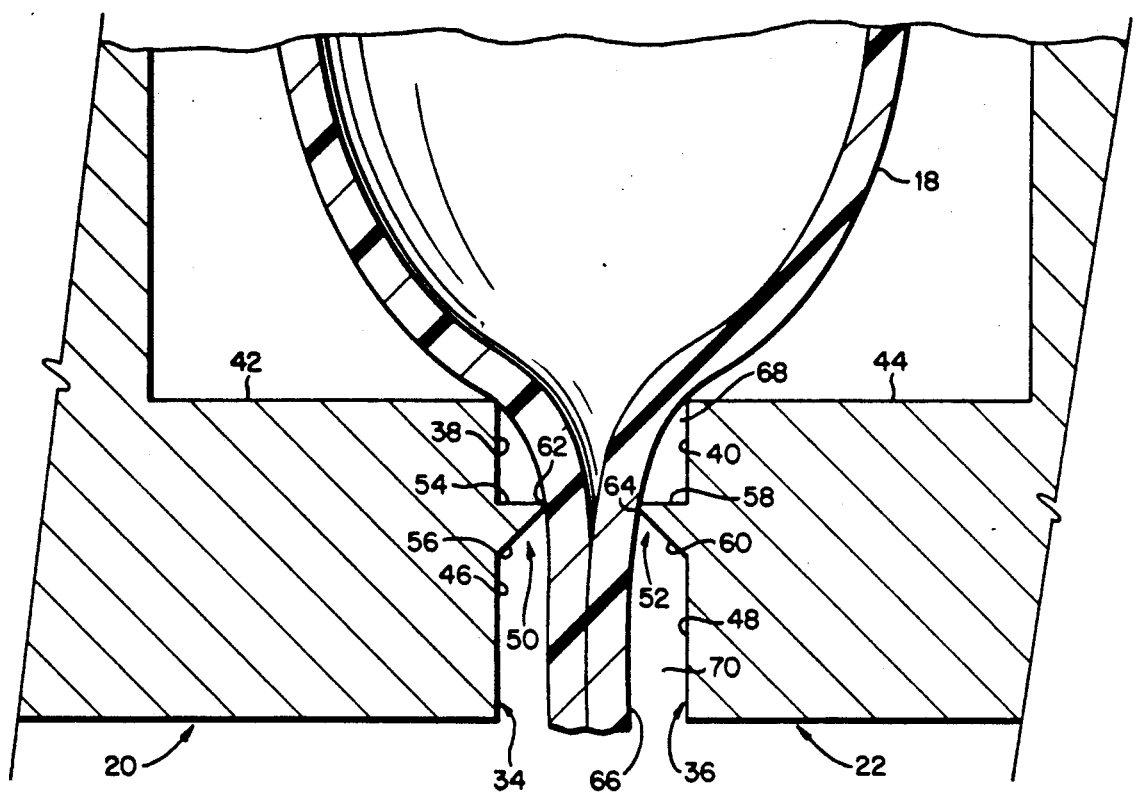
FIG. 2 is a partial side section of the apparatus shown in FIG. 1 at the commencement of a pinch-off operation in accordance with the invention.

With reference now to FIG. 2, the wall surfaces 34, 36 of the mold halves 20, 22 are shown to include upper, substantially vertical surfaces 38, 40, respectively, extending downwardly from the bottom wall surfaces 42, 44 of the mold cavity formed by mold halves 20, 22. There are also provided lower, substantially vertical surfaces 46, 48 in substantial vertical alignment with upper vertical surfaces 38, 40. Intermediate the upper and lower surfaces 38, 46 and 40, 48 are a pair of not necessary identical pinch-off projections 50, 52 which extend toward each other. It will be appreciated that projections 50 and 52 are shown in FIG. 1 in oversized relation to the mold halves merely for facilitating an understanding of the invention.

Projection 50 is formed by a horizontal surface 54 and an inclined surface 56 extending downwardly and toward the lower vertical wall surface 46. Similarly, projection 52 is formed by a horizontal surface 58 and an inclined surface 60 extending downwardly toward the lower vertical wall surface 48. This arrangement forms laterally opposed pinch-off edges 62, 64 which cooperate to sever a re-grindable plastics portion 66 of the parison as described in further detail below. While not shown, it will be appreciated that the edges 62, 64 have a substantially flat, vertical surface extending between about 0.005 and 0.010 inch for durability, i.e., so that the projection edges are not so sharp as to result in rapid wear upon repeated use. The edges are nevertheless sharp enough to clearly sever the regrindable plastic portion 66.

It has been determined that the projections 50, 52 do not necessarily need to extend along the entire length of the mold parting line. Specifically, it is believed that good results are achieved so long as the projections extend a length approximately twice the diameter of the parison, or about ⅜ the diameter of the finished container.

It will be appreciated from FIGS. 2 through 5 that upon closing of the mold halves 20, 22 an upper recess 68 (which opens to the mold cavity) and lower recess 70 are formed above and below the projections 50, 52. The size of the respective recesses, and the configuration of projections 50, 52 are critical to the attainment of an effectively heat welded seam along the mold parting line.

More specifically, in accordance with one exemplary embodiment, it has been found that upper vertical surfaces 38, 40 should define a depth for the recess 68 of about 0.030 inch, as measured from horizontal mold cavity surfaces 42, 44 to horizontal projection surfaces 54 and 58, respectively. At the same time, surfaces 54 and 58 should project away from the surfaces 38, 40 a distance of about 0.015 inch each, so that the upper cavity 68 has a substantially square configuration. It has also been determined that the angle at which surfaces 56 and 60 extend relative to the vertical surfaces of the edges 62, 64 is also critical. Depending on the particular plastic employed, an angle of from about 25° to about 50° is required. The above dimensions may vary somewhat depending on the particular thermoplastic material utilized in the process, as well as its selected wall thickness.

The lower recess 70 has a width, as measured from wall surface 46 to wall surface 48, when the mold halves 20, 22 are closed, of about 0.030 inch, or substantially the same as the width of upper recess 68. This dimension may also change, however, again depending on the plastic material employed in the process and the wall thickness thereof. In any case, it is important that the width of the lower recess be less than two times the wall thickness of the parison, as will be explained below.

The manner in which the pinch-off arrangement of the present invention creates a high quality weld or seam along the mold parting line will now be described with reference to FIGS. 2 through 5.

In FIG. 2, the mold halves 20 and 22 are shown to have closed toward each other along the one or more tracks 32 to a position where projections 50, 52 contact the outer surfaces of the parison 18 and prior to the introduction of pressurized air into the mold cavity.

Figure 3:
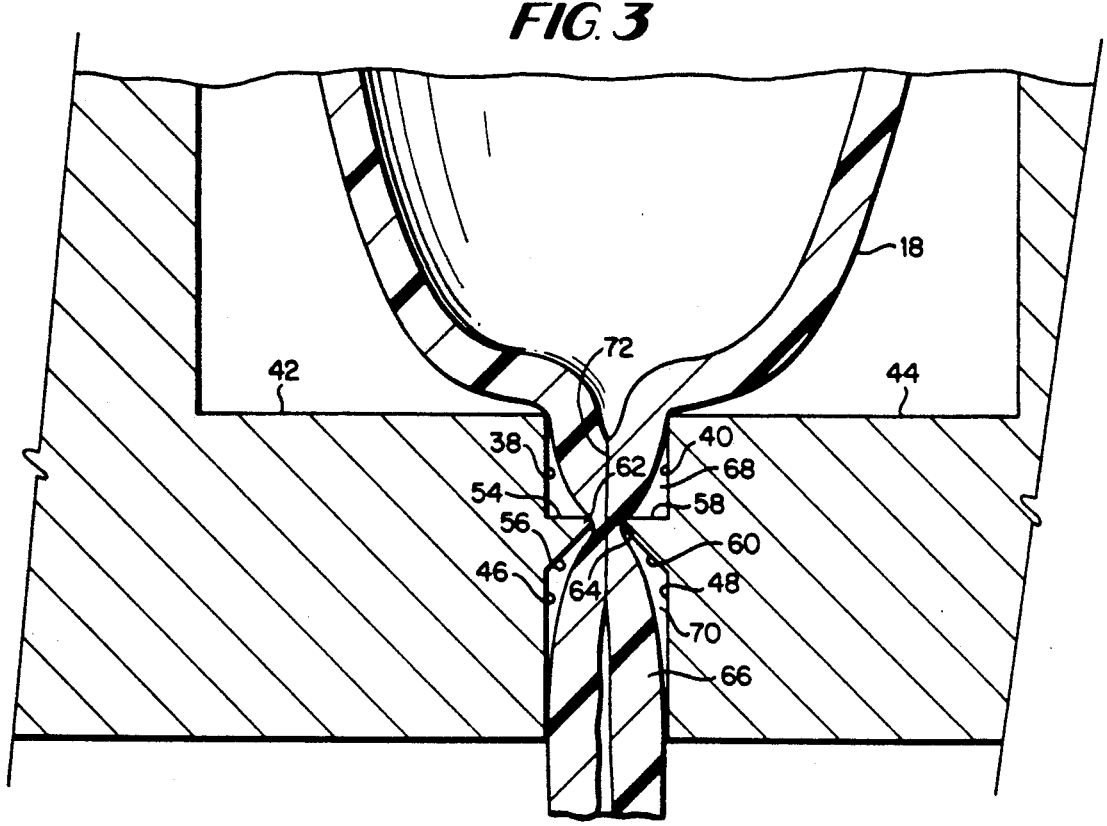
FIGS. 3 and 4 are partial side sections of the apparatus shown in FIG. 1 at intermediate stages of the pinch-off operation.

In FIG. 3, mold halves have closed further upon the parison 18 and projections 50, 52 have begun to pinch-off the parison to the point where a discernible plastic portion 66 is formed. At the same time, a lower portion of the parison 18 is being confined to the configuration of the upper recess 68 and a well defined seam 72 is beginning to take shape where opposite sides of the parison are pressed together.

Figure 4:
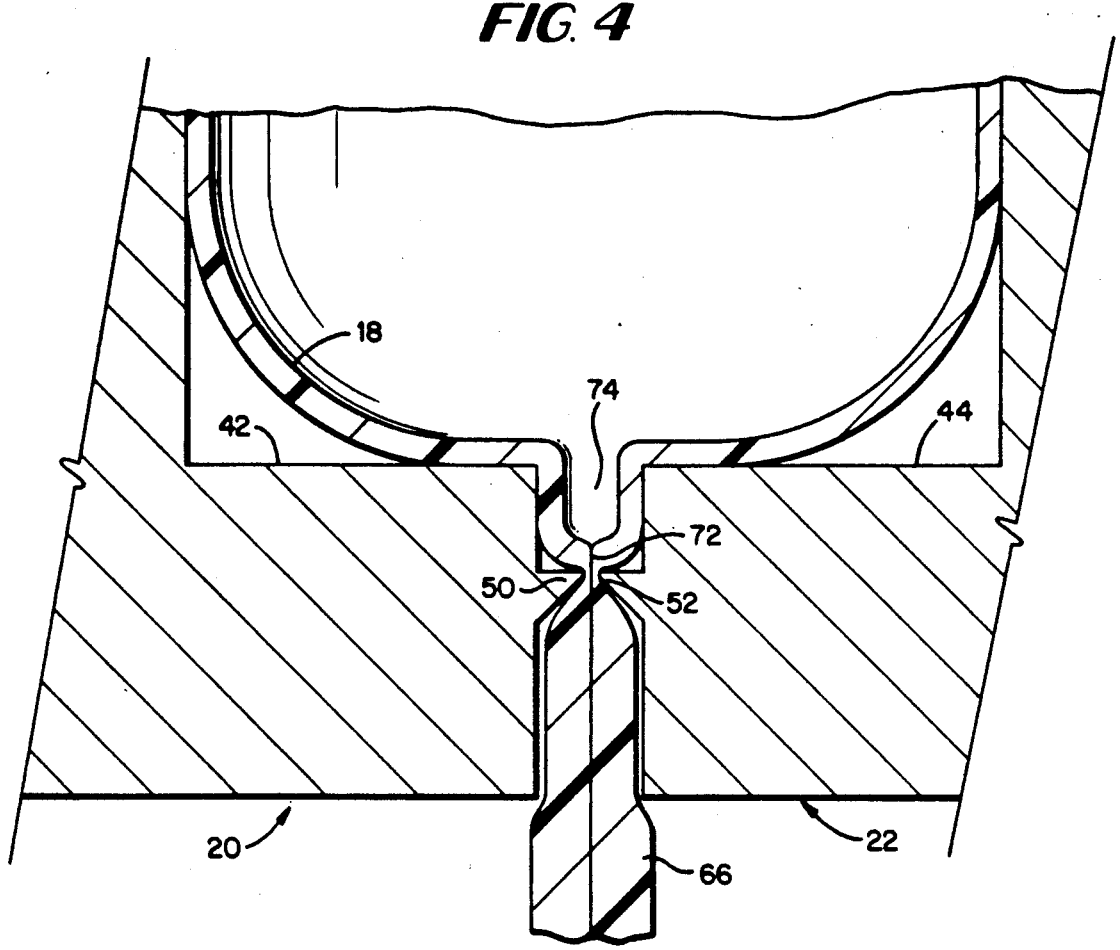

Referring now to FIG. 4, the blow mold halves 20 and 22 are substantially completely closed and a low pressure blow molding operation has commenced, blowing the parison into engagement with the mold cavity walls. It will be noted that the projections 50, 52 have almost completely severed the plastic portion 66 from the parison and a hollow groove 74 is now formed along the bottom of the container directly above the seam 72 as a result of the blow molding operation.

Figure 5:
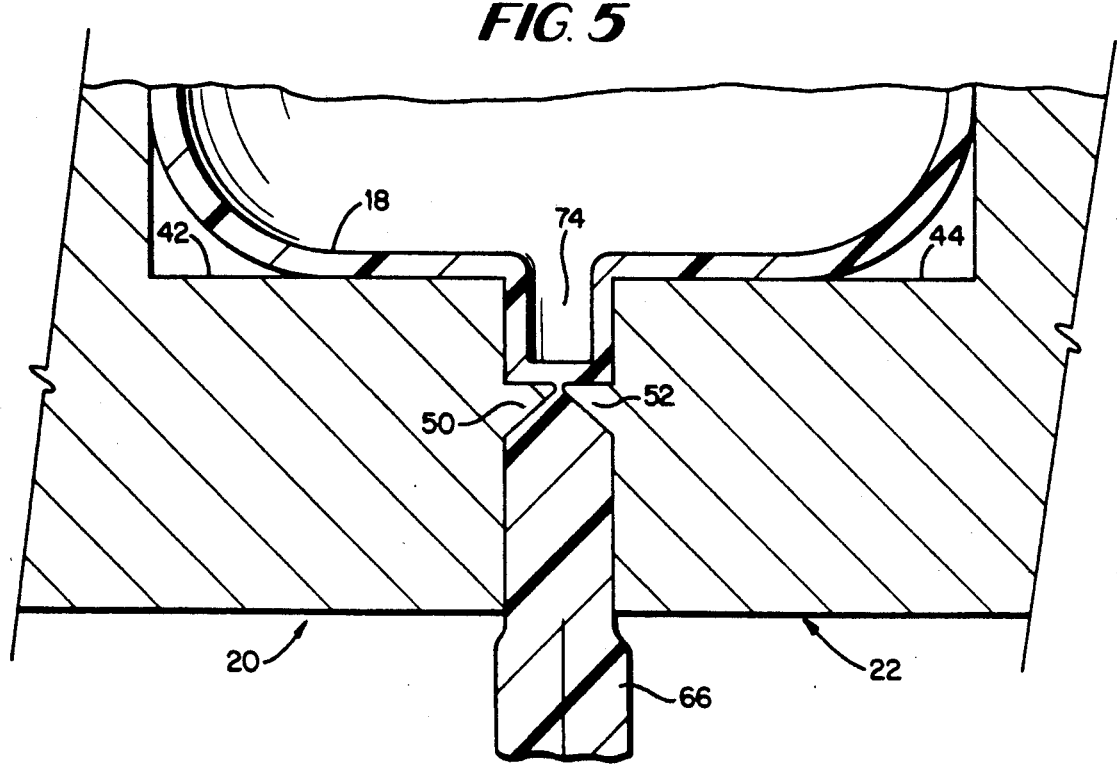
FIG. 5 is a partial side section of the apparatus shown in FIG. 1 at completion of the pinch-off operation.

With reference now to FIG. 5, the mold halves 20 and 22 are completely closed so that projections 50 and 52 engage each other so as to completely sever the plastic portion 66 from the now substantially completely blow molded container. As will be appreciated, the container wall is now blown into substantially complete conformance with the upper recess 68 and, at the same time, the plastic portion 66 is squeezed or forced out of the lower cavity 70. This is because the distance between wall surfaces 46 and 48 is less than twice the thickness of the parison wall so that the material is subjected to very high pressures as a result of the closing of the mold halves. The heat generated by these compressive forces is sufficient to raise the temperature of the container wall along the seam 72 above the melting temperature of the plastic material so that the container sides along the seam are fused together. It is important to note that the wall thickness along the seam 72 is not increased and, in fact, is decreased as compared to the original parison wall thickness. Following this stage of the operation, the mold halves are retracted and the finished container removed.

Figure 6:
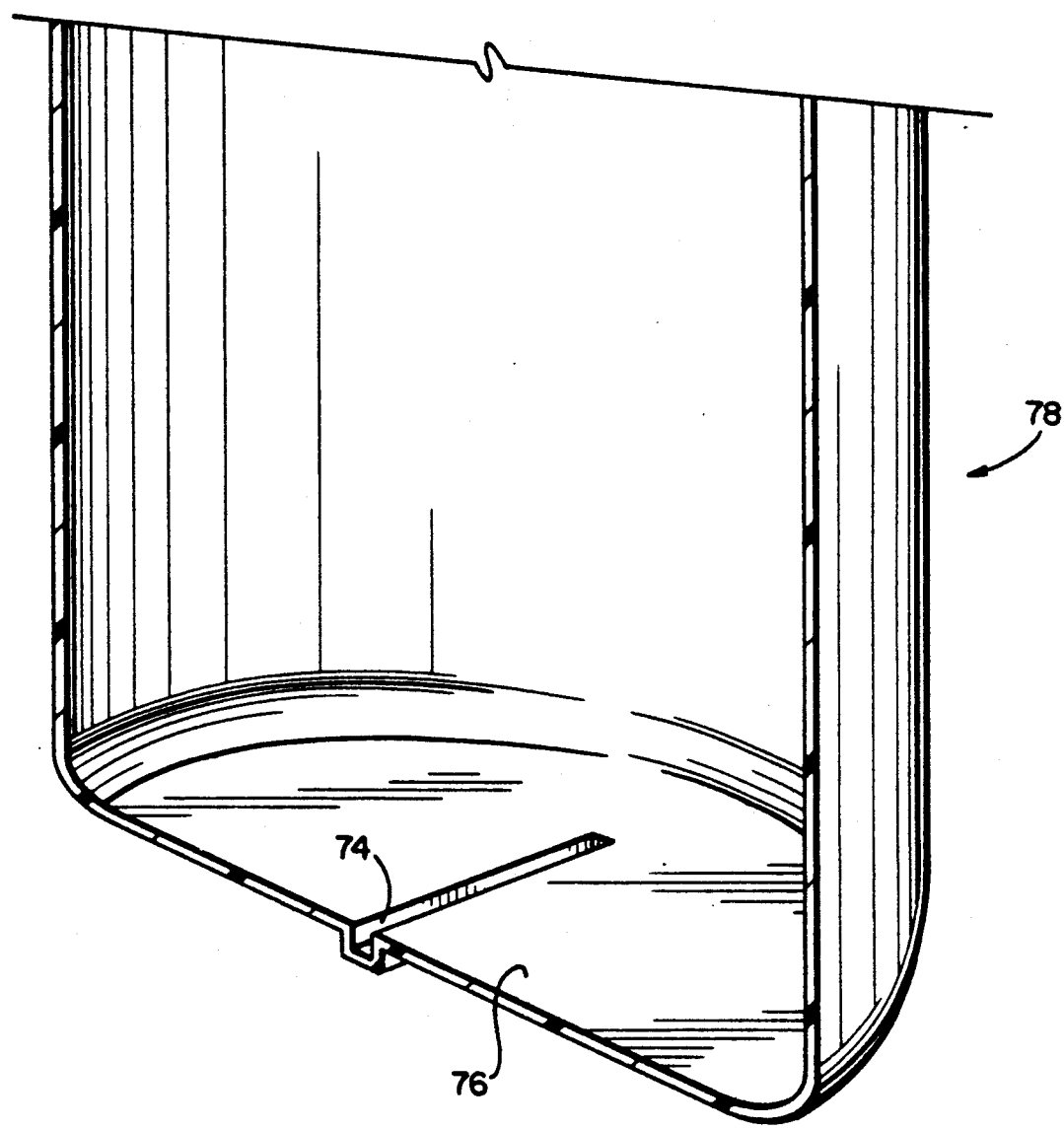
FIG. 6 is a partial perspective of an ultra thin film plastic bag produced in accordance with the invention.

With reference now to FIG. 6, an ultra thin film plastic bag is partially shown, with the above described groove 74 shown extending partially across the completed bottom wall 76 of the container 78 (formerly the parison 18) with the seam along the bottom of the groove, offset from the bottom wall 76.

It will be appreciated that during the blow molding operation, the wall thickness of the parison decreases as the parison is blown radially outwardly into engagement with the mold cavity walls to a desired wall thickness. For example in one exemplary embodiment of the invention, a 5.0 inch diameter parison with a wall thickness of about 0.004 inch is blow molded to an 8.0 inch diameter bag with a wall thickness of about 0.0025 inch.

In a related aspect of the invention, a process for forming ultra thin film bags is provided which comprises the steps of a) extruding a plastic parison 18; b) providing a pair of blow mold halves 20, 22, each of which is formed with a vertical parting line surface 34 or 36 including a pinch-off projection 50 or 52 intermediate upper and lower edges of the parting line surface; c) closing the blow mold halves 20, 22 about the parison 18; d) blow molding the parison 18 within a mold cavity 24, 26 formed by the blow mold halves. Step (b) is carried out by shaping the pinch-off projections 50, 52, including angled surfaces 56, 60, and upper and lower portions 38, 46, 40, 48 of the parting line surfaces to cause the parison 18 in this area to reach a temperature at least equal to the melting point temperature of the plastic to thereby provide an effective heat seal along a seam 72 created by the pinch-off projections.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of forming an ultra thin film plastic container and heat sealing a seam thereof comprising the steps of:
    a) forming a parison of plastic material having a first predetermined wall thickness, said wall thickness being substantially uniform in an area where the seam is to be formed;
    b) providing a pair of blow mold halves, each of which is formed with a mold cavity portion surrounded by a parting service, at least one portion of said parting surface of each blow mold half having a pinch-off projection located intermediate opposite edges of said parting surface;
    c) closing said blow mold halves about said parison to enclose said parison within a mold cavity formed by said mold cavity portions, said pinch-off projections and said one portion of said parting surface establishing a first recess which opens to said mold cavity;
    d) blow molding the parison within said mold cavity to form an ultra thin film plastic container having a second predetermined thickness less than said first predetermined wall thickness, said second predetermined wall thickness being substantially uniform at least adjacent said pinch-off projections within said first recess; and wherein said pinch-off projections are sized and shaped relative to said at least one portion of said parting surface of each blow mold half and said pinch-off portions and said parting surface establish a second recess extending away from said mold cavity, said second recess having a width less than twice said first predetermined wall thickness of the parison so as to cause said plastic material below said pinch-off projections to be compressed out of the second recess thereby generating heat during steps (c) and (d) sufficient to raise the temperature of the plastic material within said first recess and adjacent said pinch-off projections to at least a melting temperature of the plastic material to thereby provide an effective head sealed seam immediately adjacent said pinch-off projections and within said first recess, said seam having a wall thickness substantially equal to said second predetermined wall thickness.

2. The method according to claim 1 wherein said first recess has a width and depth of about 0.030 inch each.

3. The method of claim 1 wherein said second predetermined wall thickness is about two mil.

4. The method of claim 1 wherein each pinch-off projection comprises a horizontal portion and an inclined portion, the inclined portion extending downwardly away from vertical at an angle of from about 25° to about 50°.

5. The method of claim 4 wherein the horizontal portions define a width for the first recess of about 0.030 inch.

6. The method of claim 1 wherein, during steps (c) and (d), parison material is blow molded into said first recess, thereby forming a hollow groove above said seam.

7. The method of claim 1 wherein said second predetermined wall thickness is about 1 to about 10 mil.

* * * * *